United States Patent
Zhong

(10) Patent No.: US 9,491,682 B2
(45) Date of Patent: Nov. 8, 2016

(54) WIRELESS ROUTING DEVICE, MOBILE TERMINAL, AND MANAGEMENT SYSTEM AND METHOD

(71) Applicant: Huawei Device Co., Ltd., Shenzhen (CN)

(72) Inventor: Zhen Zhong, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 186 days.

(21) Appl. No.: 14/466,268

(22) Filed: Aug. 22, 2014

(65) Prior Publication Data

US 2014/0362808 A1    Dec. 11, 2014

Related U.S. Application Data

(63) Continuation of application No. PCT/CN2012/087858, filed on Dec. 28, 2012.

(30) Foreign Application Priority Data

Apr. 1, 2012    (CN) .......................... 2012 1 0094503

(51) Int. Cl.
*H04W 40/02* (2009.01)
*H04W 92/10* (2009.01)
(Continued)

(52) U.S. Cl.
CPC ............ *H04W 40/02* (2013.01); *H04L 45/566* (2013.01); *H04W 88/08* (2013.01); *H04W 92/10* (2013.01); *H04L 41/082* (2013.01);
(Continued)

(58) Field of Classification Search
None
See application file for complete search history.

(56) References Cited

U.S. PATENT DOCUMENTS 8,019,329 B2 * 9/2011 Mohanty ............... G06F 21/305
455/420
8,190,899 B1 * 5/2012 Audebert ........... G06Q 20/3672
705/66

(Continued)

FOREIGN PATENT DOCUMENTS

CN          1932786 A      3/2007
CN        101175310 A      5/2008

(Continued)

OTHER PUBLICATIONS

Partial English Translation and Abstract of Chinese Patent Application No. CN101959024A, Nov. 13, 2014, 4 pages.

(Continued)

*Primary Examiner* — Hong Cho
(74) *Attorney, Agent, or Firm* — Conley Rose, P.C.

(57) ABSTRACT

A method for managing configuration of a routing device, including: a first wireless communication unit configured to receive a request message comprising a management command, wherein the request message is sent by a mobile terminal and corresponds to the application programming interface; an application programming interface unit configured to set an application programming interface, and decapsulate, based on the application programming interface set by the application programming interface unit, the request message received by the first wireless communication unit, to obtain the management command; and an execution unit configured to execute a corresponding operation according to the management command obtained by the application programming interface unit. Correspondingly, a mobile terminal, and a management system and method are also disclosed.

12 Claims, 6 Drawing Sheets

(51) Int. Cl.
*H04W 88/08* (2009.01)
*H04L 12/721* (2013.01)
*H04L 12/24* (2006.01)
*H04L 12/26* (2006.01)
*H04L 29/08* (2006.01)

(52) U.S. Cl.
CPC ...... *H04L 41/0806* (2013.01); *H04L 43/0817* (2013.01); *H04L 67/02* (2013.01)

(56) References Cited

U.S. PATENT DOCUMENTS

| | | | |
|---|---|---|---|
| 8,565,818 | B1 | 10/2013 | Bertz et al. |
| 2007/0040895 | A1* | 2/2007 | Barbeau ........... G08B 13/19658 348/14.01 |
| 2009/0257416 | A1 | 10/2009 | Walker et al. |
| 2011/0292922 | A1 | 12/2011 | Yang |
| 2012/0028571 | A1 | 2/2012 | Sato |

FOREIGN PATENT DOCUMENTS

| | | | |
|---|---|---|---|
| CN | 101854740 | A | 10/2010 |
| CN | 101959024 | A | 1/2011 |
| CN | 102202234 | A | 9/2011 |
| CN | 102685210 | A | 9/2012 |
| EP | 2393323 | A1 | 12/2011 |
| JP | 2011004037 | A | 1/2011 |
| JP | 2011523245 | A | 8/2011 |
| JP | 20110259422 | A | 12/2011 |
| JP | 2012034140 | A | 2/2012 |
| JP | 4889813 | B1 | 3/2012 |

OTHER PUBLICATIONS

Partial English Translation and Abstract of Chinese Patent Application No. CN102685210A, Aug. 20, 2014, 4 pages.
Partial English Translation and Abstract of Chinese Patent Application No. CN1932786A, Part 1, Nov. 13, 2014, 4 pages.
Partial English Translation and Abstract of Chinese Patent Application No. CN1932786A, Part 2, Nov. 13, 2014, 3 pages.
Foreign Communication From a Counterpart Application, PCT Application No. PCT/CN2012/087858, English Translation of International Search Report dated Apr. 4, 2013, 2 pages.
Foreign Communication From a Counterpart Application, PCT Application No. PCT/CN2012/087858, English Translation of Written Opinion dated Apr. 4, 2013, 18 pages.
Foreign Communication From a Counterpart Application, Chinese Application No. 201210094503.0, Chinese Office Action dated Apr. 21, 2014, 5 pages.
Foreign Communication From a Counterpart Application, Chinese Application No. 201210094503.0, Chinese Search Report dated Apr. 10, 2014, 2 pages.
Fleischman, G., "Using Apple's mobile AirPort Utility," Internet Citation, Retrieved from the Internet: URL: http://www.macworld.com/article/1163084/mobile_airport_utility.html, XP002697768, Oct. 18, 2011, 6 pages.
Foreign Communication From a Counterpart Application, European Application No. 12873501.6, Extended European Search Report dated Dec. 16, 2014, 7 pages.
Partial English Translation and Abstract of Japanese Patent Application No. JP4889813, Dec. 31, 2015, 38 pages.
Partial English Translation and Abstract of Japanese Patent Application No. JPA2011004037, Dec. 31, 2015, 33 pages.
Partial English Translation and Abstract of Japanese Patent Application No. JP2011259422, Dec. 31, 2015, 25 pages.
Partial English Translation and Abstract of Japanese Patent Application No. JPA2011523245, Dec. 31, 2015, 33 pages.
Partial English Translation and Abstract of Japanese Patent Application No. JPA2012034140, Dec. 31, 2015, 67 pages.
Foreign Communication From a Counterpart Application, Japanese Application No. 2015-502063, Japanese Office Action dated Oct. 27, 2015, 2 pages.
Foreign Communication From a Counterpart Application, Japanese Application No. 2015-502063, English Translation of Japanese Office Action dated Oct. 27, 2015, 3 pages.
"Application programming interface—Wikipedia, the free encyclopedia," Retrieved from the Internet: URL: http://web.archive.org/web/20101227183034/http://en.wikipedia.org/wiki/Application_programming_interface [retrieved on Sep. 22, 2015], Dec. 27, 2010, 10 pages.
"DMZ (computing)—Wikipedia, the free encyclopedia," Retrieved from the Internet: URL:https://en.wikipedia.org/w/Index.php?title=DMZ_(computing)&oldid=477935470 [retrieved on May 24, 2016], Feb. 20, 2012, 4 pages.
"What is the real function and use of a DMZ on a network?," Retrieved from the Internet: URL: http://security.stackexchange.com/questions/3667/what-is-the-real-function-and-use-of-a-dmz-on-a-network [retrieved on May 24, 2016], May 9, 2011, 2 pages.
"Apple Airport Extreme + Windows 7 + Old games requiring DMZ=Rage," XP055275097, Retrieved from the Internet: URL: https://discussions.apple.com/thread/3763139?tstart-0 [retrieved on May 24, 2016], Feb. 25, 2012, 2 pages.
Foreign Communication From a Counterpart Application, European Application No. 12873501.6, European Oral Proceedings dated Jun. 14, 2016, 9 pages.

* cited by examiner

WIRELESS ROUTING DEVICE, MOBILE TERMINAL, AND MANAGEMENT SYSTEM AND METHOD

CROSS-REFERENCE TO RELATED APPLICATIONS

This application is a continuation of International Application No. PCT/CN2012/087858, filed on Dec. 28, 2012, which claims priority to Chinese Patent Application No. 201210094503.0, filed on Apr. 1, 2012, both of which are hereby incorporated by reference in their entireties.

TECHNICAL FIELD

The present invention relates to the field of communications, and in particular, to a wireless routing device, a mobile terminal, and a management system and method.

BACKGROUND

At present, with the popularity of mobile terminals, wireless routing devices are more widely used. However, a conventional wireless routing device is mainly managed by using a personal computer (PC). The PC may have poor mobility but the conventional wireless routing device needs to be moved frequently, and at times, in the outdoors, the wireless router may also be used by a mobile terminal. Therefore the conventional wireless routing device managed by using the PC may not meet demands of users. Therefore, it may be advantageous to develop a wireless routing device managed by using a mobile terminal.

SUMMARY

Embodiments of the present invention provide a wireless routing device, a mobile terminal, and a management system and method, which can implement management of a wireless routing device by using a mobile terminal, thereby improving applicability of the wireless routing device and extending an applicable scope of the mobile terminal.

An embodiment of the present invention provides a wireless routing device, including: a first wireless communication unit; an application programming interface unit configured to set an application programming interface; and an execution unit, where the first wireless communication unit is configured to receive a request message including a management command, where the request message is sent by a mobile terminal and corresponds to the application programming interface; the application programming interface unit is further configured to decapsulate, based on the application programming interface set by the application programming interface unit, the request message received by the first wireless communication unit, to obtain the management command; and the execution unit is configured to execute a corresponding operation according to the management command obtained by the application programming interface unit.

Correspondingly, an embodiment of the present invention further provides a mobile terminal, including a management unit, an application programming interface invoking unit, and a second wireless communication unit, where the management unit is configured to generate information that includes a management command for a wireless routing device, where the wireless routing device includes a preset application programming interface; the application programming interface invoking unit is configured to encapsulate, according to pre-obtained information about the application programming interface, the information that is generated by the management unit and includes the management command for the wireless routing device, to generate a request message that is corresponding to the application programming interface and includes the management command for the wireless routing device; and the second wireless communication unit is configured to send, to the wireless routing device, the request message that is generated by the application programming interface invoking unit and includes the management command for the wireless routing device.

Correspondingly, an embodiment of the present invention further provides a management system, including a wireless routing device and a mobile terminal, where the wireless routing device includes: a first wireless communication unit; an application programming interface unit configured to set an application programming interface; and an execution unit, where the first wireless communication unit is configured to receive a request message including a management command, where the request message is sent by a mobile terminal and corresponds to the application programming interface; the application programming interface unit is further configured to decapsulate, based on the application programming interface set by the application programming interface unit, the request message received by the first wireless communication unit, to obtain the management command; and the execution unit is configured to execute a corresponding operation according to the management command obtained by the application programming interface unit; and the mobile terminal includes a management unit, an application programming interface invoking unit, and a second wireless communication unit, where the management unit is configured to generate information that includes a management command for a wireless routing device, where the wireless routing device includes a preset application programming interface; the application programming interface invoking unit is configured to encapsulate, according to pre-obtained information about the application programming interface, the information that is generated by the management unit and includes the management command for the wireless routing device, to generate a request message that is corresponding to the application programming interface and includes the management command for the wireless routing device; and the second wireless communication unit is configured to send, to the wireless routing device, the request message that is generated by the application programming interface invoking unit and includes the management command for the wireless routing device.

Correspondingly, an embodiment of the present invention further provides a method for managing configuration of a routing device, where the wireless routing device includes a preset application programming interface, the method including: receiving, by the wireless routing device, a request message including a management command, where the request message is sent by a mobile terminal and corresponds to the application programming interface; decapsulating, by the wireless routing device, the request message based on the application programming interface, to obtain the management command; and executing, by the wireless routing device, a corresponding operation according to the management command.

Correspondingly, an embodiment of the present invention further provides a method for managing configuration of a routing device, including: generating, by a mobile terminal, information that includes a management command for a wireless routing device, where the wireless routing device includes a preset application programming interface; encapsulating, by the mobile terminal according to pre-obtained information about the application programming interface, the information that includes the management command for the wireless routing device, to generate a request message that is corresponding to the application programming interface and includes the management command for the wireless routing device; and sending, by the mobile terminal, the request message to the wireless routing device.

A wireless routing device, mobile terminal, management system, and method provided by the embodiments of the present invention may have the following beneficial effects:

The wireless routing device receives a request message including a management command, where the request message is sent by the mobile terminal and corresponds to the application programming interface preset by the wireless routing device; the wireless routing device encapsulates the request message based on the application programming interface, to obtain the management command; and the wireless routing device executes a corresponding operation according to the management command. In this way, management of the wireless routing device can be implemented by using the mobile terminal, thereby improving applicability of the wireless routing device and extending an applicable scope of the mobile terminal.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
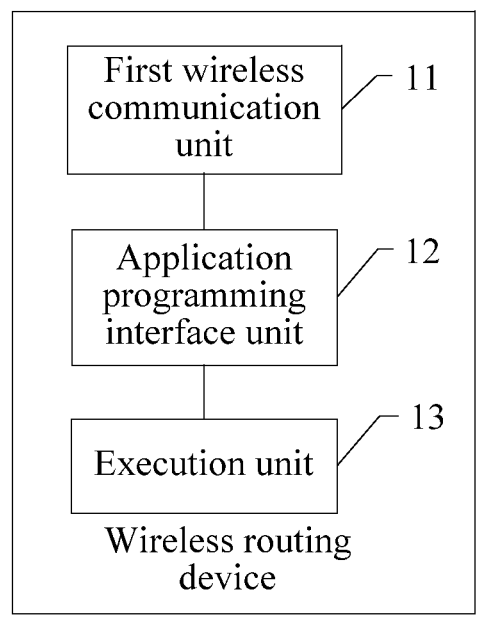
FIG. 1 is a schematic structural diagram of a wireless routing device according to an embodiment of the present invention.

FIG. 1 is a schematic structural diagram of a wireless routing device according to an embodiment of the present invention. The wireless routing device includes: a first wireless communication unit 11; an application programming interface unit 12 configured to set an application programming interface; and an execution unit 13, where the first wireless communication unit 11 is configured to receive a request message including a management command, where the request message is sent by a mobile terminal and corresponds to the application programming interface; the application programming interface unit 12 is further configured to decapsulate, based on the application programming interface set by the application programming interface unit 12, the request message received by the first wireless communication unit 11, to obtain the management command; and the execution unit 13 is configured to execute a corresponding operation according to the management command obtained by the application programming interface unit 12.

It should be noted that a receiving method for the first wireless communication unit 11 to receive the request message including the management command, where the request message is sent by the mobile terminal and corresponds to the application programming interface, may be using Wireless Fidelity (WiFi), Bluetooth, or infrared to receive the request message including the management command, where the request message is sent by the mobile terminal and corresponds to the application programming interface, and the present invention includes but is not limited to the receiving manners listed above. The application programming interface may be an Application Program Interface (API), and the API may be a function rule.

It should be noted that the application programming interface unit 12 is further configured to set, according to a function of the wireless routing device, an application programming interface corresponding to the function.

When the mobile terminal initiates a management process to the wireless routing device, the mobile terminal may invoke the application programming interface set by the application programming interface unit 12. An invoking process by the mobile terminal may be: encapsulating, according to pre-obtained information about the application programming interface, generated information that includes the management command, to generate the request message that is corresponding to the application programming interface set by the application programming interface unit 12 and includes the management command; and sending the request message to the wireless routing device.

The decapsulating, by the application programming interface unit 12 based on the application programming interface set by the application programming interface unit 12, the request message received by the first wireless communication unit 11 may be: performing, by the application programming interface unit 12 based on the application programming interface set by the application programming interface unit 12, Hypertext Transport Protocol (HTTP) decapsulation on the request message received by the first wireless communication unit 11; or performing, by the application programming interface unit 12 based on the application programming interface set by the application programming interface unit 12, Transmission Control Protocol (TCP) decapsulation on the request message received by the first wireless communication unit 11; or performing, by the application programming interface unit 12 based on the application programming interface set by the application programming interface unit 12, Socket protocol decapsulation on the request message received by the first wireless communication unit 11; or performing, by the application programming interface unit 12 based on the application programming interface set by the application programming interface unit 12, User Datagram Protocol (UDP) decapsulation on the request message received by the first wireless communication unit 11; or performing, by the application programming interface unit 12 based on the application programming interface set by the application programming interface unit 12, HTTP over Secure Socket Layer (HTTPS) decapsulation on the request message received by the first wireless communication unit 11.

Specifically, as for which protocol is used for decapsulation, different protocols may be used for decapsulation according to different application programming interfaces. In an embodiment of the present invention, the encapsulation performed by the application programming interface unit 12 on the request message received by the first wireless communication unit 11 includes but is not limited to the decapsulation forms listed above.

It should be noted that in another implementation manner, the first wireless communication unit 11 is further configured to receive a request message including a configuration management command, where the request message is sent by the mobile terminal and corresponds to the application programming interface; the application programming interface unit 12 is further configured to decapsulate, based on the application programming interface set by the application programming interface unit 12, the request message received by the first wireless communication unit 11, to obtain the configuration management command; and the execution unit 13 is configured to execute a corresponding configuration operation according to the configuration management command obtained by the application programming interface unit 12.

In this implementation manner, a corresponding configuration operation may be executed according to the configuration management command sent by the mobile terminal. The following is an example of the configuration operation.

If the request message that includes the configuration management command is the following message:

POST api/security/dmz HTTP/1.1
<?xml version="1.0" encoding="UTF-8"?>
<request>
    <DmzStatus>1</DmzStatus>
    <DmzIPAddress>192.168.1.101</DmzIPAddress>
</request> where the request message is corresponding to an application programming interface that is set by the application programming interface unit 12 and is corresponding to a demilitarized zone (DMZ) function, after the application programming interface unit 12 decapsulates the foregoing message based on the application programming interface that is set by the application programming interface unit 12 and is corresponding to the DMZ function, the application programming interface unit 12 obtains a configuration management command for performing configuration management of the DMZ function, where content of the configuration management is enabling the DMZ function and setting a host Internet Protocol (IP) address to 192.168.1.101. In this way, the execution unit 13 executes, according to the foregoing configuration management command, a configuration operation of enabling the DMZ function and setting the host IP address to 192.168.1.101. This example is merely an implementation example provided by the embodiment of the present invention, and the present invention also includes but is not limited to configuration operations on functions that can be implemented by the wireless routing device such as a subscriber identity module (SIM) card of the wireless routing device, state monitoring, a board function, login management, and online upgrade.

In this implementation manner, the application programming interface unit 12 is further configured to encapsulate, based on the application programming interface set by the application programming interface unit 12, execution state information about the configuration operation executed by the execution unit 13, to generate a return message that includes the execution state information; and the first wireless communication unit 11 is further specifically configured to send, to the mobile terminal, the return message that is generated by the application programming interface unit 12 and includes the execution state information.

In this way, the mobile terminal may display, on a preset management interface, the execution state information such as whether the configuration operation executed by the wireless routing device is successful or the progress of the configuration operation executed by the wireless routing device.

It should be noted that in another specific implementation manner, the first wireless communication unit 11 is further configured to receive a request message including a command for requesting returning current state information, where the request message is sent by the mobile terminal and corresponds to the application programming interface; the application programming interface unit 12 is further configured to decapsulate, based on the application programming interface set by the application programming interface unit 12, the request message received by the first wireless communication unit 11, to obtain the command for requesting returning current state information; the execution unit 13 is further configured to obtain current state information; the application programming interface unit 12 is further configured to encapsulate, based on the application programming interface set by the application programming interface unit 12, the current state information obtained by the execution unit 13, to generate a response message that includes the current state information; and the first wireless communication unit 11 is further configured to send, to the mobile terminal, the response message that is generated by the application programming interface 12 and includes the current state information.

In this implementation manner, the mobile terminal can monitor the current state information of the wireless routing device, for example, monitor and display information such as a battery level or signal strength of the wireless routing device or the number of mobile terminals connected to the routing device.

It should be noted that the mobile terminal in this embodiment includes but is not limited to a mobile terminal such as a mobile phone terminal or a tablet computer.

In this embodiment, the first wireless communication unit receives a request message including a management command, where the request message is sent by the mobile terminal and corresponds to the application programming interface preset by the wireless routing device; the application programming interface unit encapsulates the request message based on the application programming interface, to obtain the management command; and the execution unit executes a corresponding operation according to the management command, to implement management of the wireless routing device by using the mobile terminal. In this way, management of the wireless routing device is implemented by using the mobile terminal, thereby improving applicability of the wireless routing device and extending an applicable scope of the mobile terminal.

Figure 2:
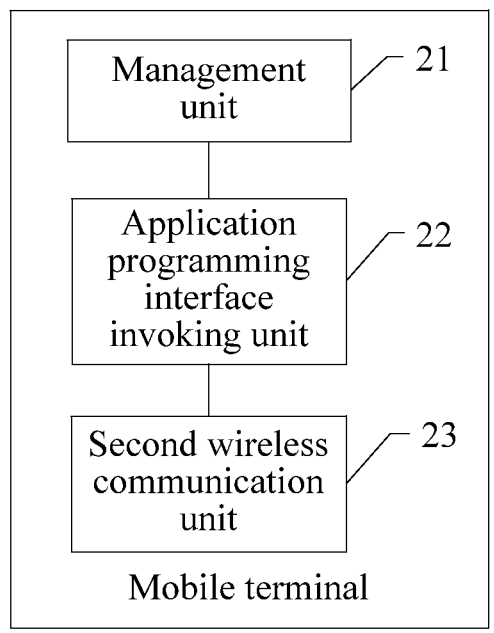
FIG. 2 is a schematic structural diagram of a mobile terminal according to an embodiment of the present invention.

FIG. 2 is a schematic structural diagram of a mobile terminal according to an embodiment of the present invention. As shown in FIG. 2, the mobile terminal includes a management unit 21, an application programming interface invoking unit 22, and a second wireless communication unit 23.

The management unit 21 is configured to generate information that includes a management command for a wireless routing device, where the wireless routing device includes a preset application programming interface.

The application programming interface invoking unit 22 is configured to encapsulate, according to pre-obtained information about the application programming interface, the information that is generated by the management unit 21 and includes the management command for the wireless routing device, to generate a request message that is corresponding to the application programming interface and includes the management command for the wireless routing device.

It can be understood that before the mobile terminal initiates a management request to the wireless routing device, the mobile terminal obtains the information about the application programming interface, so that the application programming interface invoking unit 22 encapsulates, according to the pre-obtained information about the application programming interface, the information that is generated by the management unit 21 and includes the management command for the wireless routing device, to generate the request message that is corresponding to the application programming interface and includes the management command for the wireless routing device. The application programming interface may be an API, and the API may be a function rule.

The second wireless communication unit 23 is configured to send, to the wireless routing device, the request message that is generated by the application programming interface invoking unit 22 and includes the management command for the wireless routing device.

It should be noted that a sending method for the second wireless communication unit 23 to send, to the wireless routing device, the request message that is generated by the application programming interface invoking unit 22 and includes the management command for the wireless routing device may be using WiFi, Bluetooth, or infrared to send, to the wireless routing device, the request message that is generated by the application programming interface invoking unit 22 and includes the management command for the wireless routing device, and the present invention includes but is not limited to the sending manners listed above.

It should be noted that in another specific implementation manner, the management unit 21 is further specifically configured to generate, according to an operation performed by a user on a preset management interface, the information that includes the management command for the wireless routing device.

In this implementation manner, different management commands may be generated according to different operations performed by the user on the preset management interface, so that the wireless routing device executes different operations. The preset management interface may be a management interface preset according to the application programming interface in the pre-obtained information about the application programming interface or a network protocol of the application programming interface. The management interface may include different management interfaces corresponding to different management functions, such as a dedicated interface corresponding to a DMZ function of the wireless routing device and a dedicated interface corresponding to a login management function of the wireless routing device, which are not listed one by one herein. When the user needs to manage different functions of the wireless routing device, the user may perform operations on different management interfaces. In this way, the mobile terminal provided by the embodiment of the present invention becomes more user-friendly. The management unit 21 is further configured to generate, according to an operation performed by the user on a preset window interface or widget, the information that includes the management command for the wireless routing device. Both the foregoing window interface and widget are interfaces on a mobile phone desktop. In this way, the user can manage the wireless routing device from the desktop of the mobile terminal.

It should be noted that in another implementation manner, in the information that is generated by the management unit 21 and includes the management command for the wireless routing device, the management command may also be a configuration management command; and the application programming interface invoking unit 22 is further configured to encapsulate, according to the pre-obtained information about the application programming interface, the information that is generated by the management unit 21 and includes the configuration management command for the wireless routing device, to generate the request message that is corresponding to the application programming interface and includes the configuration management command for the wireless routing device.

In this implementation manner, corresponding configuration management may be performed according to the configuration management command sent by the mobile terminal, so that the wireless routing device executes a corresponding configuration operation according to the configuration management command.

The following is an example of the configuration management.

If the foregoing request message that includes the configuration management of the routing device is the following message:

```
POST api/security/dmz HTTP/1.1
<?xml version="1.0" encoding="UTF-8"?>
<request>
    <DmzStatus>1</DmzStatus>
    <DmzIPAddress>192.168.1.101</DmzIPAddress>
</request>
``` where the request message is corresponding to an application programming interface that is set by the wireless routing device and is corresponding to the DMZ function, the configuration management command for the wireless routing device is to perform configuration management of the DMZ function, where content of the configuration management is enabling the DMZ function and setting a host IP address to 192.168.1.101. In this way, after obtaining the configuration management command, the wireless routing device executes, according to the configuration management command, a configuration operation of enabling the DMZ function and setting the host IP address to 192.168.1.101. This example is merely an implementation example provided by the embodiment of the present invention, and the present invention also includes but is not limited to configuration management of functions that can be implemented by the wireless routing device such as a SIM card of the wireless routing device, state monitoring, a board function, login management, and online upgrade.

In this implementation manner, the management unit 21 is further configured to generate, according to the operation performed by the user on the preset management interface, the information that includes the configuration management command for the wireless routing device. In this way, different information including different configuration management commands may be generated according to different operations performed by the user on the preset management interface.

In addition, the second communication unit 23 may be further configured to receive a return message that is sent by the wireless routing device and includes execution state information about the corresponding configuration operation, which is executed by the wireless routing device according to the configuration management command; and the application programming interface invoking unit 22 is further configured to decapsulate the return message received by the second communication unit 23, to obtain the execution state information. In this way, the mobile terminal may display, on the preset management interface, the execution state information such as whether the configuration operation executed by the wireless routing device is successful or the progress of the configuration operation executed by the wireless routing device.

It should be noted that in another implementation manner, the management unit 21 is configured to periodically generate the information that includes the management command for the wireless routing device, where the management command for the wireless routing device is a command for requesting returning current state information of the wireless routing device; the second wireless communication unit 23 is further configured to receive a response message that is sent by the wireless routing device and includes current state information of the wireless routing device; and the application programming interface invoking unit 22 is further specifically configured to decapsulate the response message that is received by the second wireless communication unit 23 and includes the current state information of the wireless routing device, to obtain the current state information of the wireless routing device.

In this way, the mobile terminal can obtain the current state information of the wireless routing device in real time, thereby monitoring and managing the wireless routing device.

Figure 3:
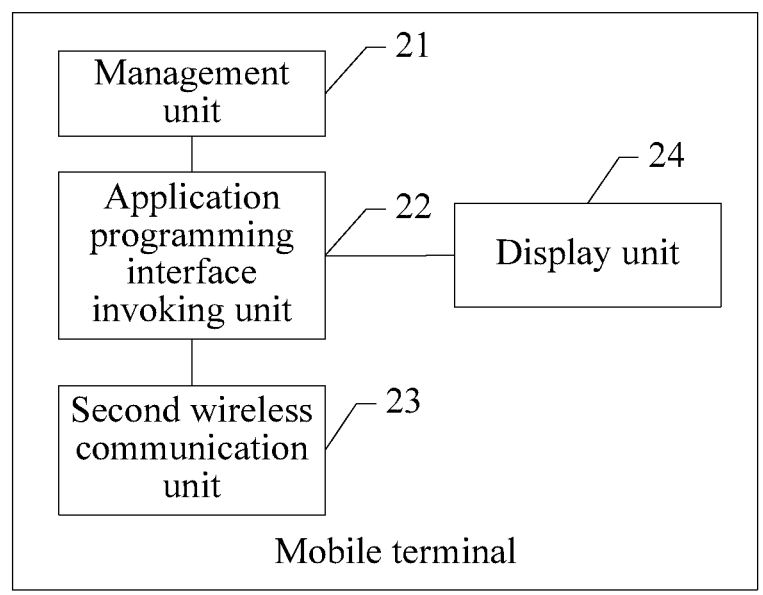
FIG. 3 is a schematic structural diagram of another implementation manner of a mobile terminal according to an embodiment of the present invention.

In addition, in this implementation manner, as shown in FIG. 3, the mobile terminal may further include a display unit 24 configured to display, on the preset management interface, the current state information obtained by the application programming interface invoking unit 22.

In this way, the mobile terminal can display the state information of the wireless routing device in real time, thereby not only monitoring and managing the wireless routing device but also enabling the user to learn the current state information of the wireless routing device in time. The display unit 24 is further configured to display, on a preset window interface or widget, the current state information obtained by the application programming interface invoking unit 22. Both the foregoing window interface and widget are interfaces on a mobile phone desktop. In this way, the current state information of the wireless routing device can be displayed on the desktop of the mobile terminal in real time, for example, information such as a battery level or signal strength of the wireless routing device or the number of mobile terminals connected to the routing device is displayed.

It should be noted that the mobile terminal in this embodiment includes but is not limited to a mobile terminal such as a mobile phone terminal or a tablet computer.

In this embodiment, the management unit generates information that includes a management command for the wireless routing device, where the wireless routing device includes a preset application programming interface; the application programming interface invoking unit encapsulates, according to pre-obtained information about the application programming interface, the information that is generated by the management unit and includes the management command for the wireless routing device, to generate a request message that is corresponding to the application programming interface and includes the management command for the wireless routing device; and the second wireless communication unit sends, to the wireless routing device, the request message that is generated by the application programming interface invoking unit and includes the management command for the wireless routing device. In this way, the mobile terminal can manage the wireless management device, thereby improving applicability of the wireless routing device and extending an applicable scope of the mobile terminal.

Figure 4:
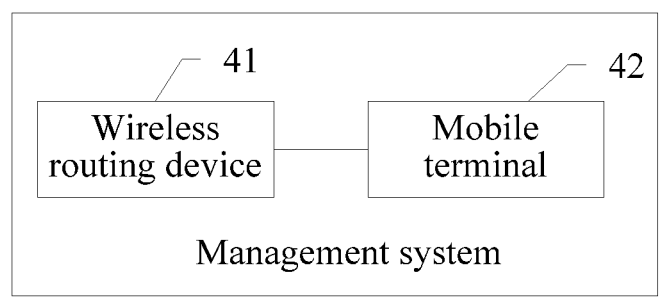
FIG. 4 is a schematic structural diagram of a management system according to an embodiment of the present invention.

FIG. 4 is a schematic structural diagram of a management system according to an embodiment of the present invention. As shown in FIG. 4, the management system includes a wireless routing device 41 and a mobile terminal 42, where the wireless routing device includes: a first wireless communication unit; an application programming interface unit configured to set an application programming interface; and an execution unit, where the first wireless communication unit is configured to receive a request message including a management command, where the request message is sent by a mobile terminal and corresponds to the application programming interface; the application programming interface unit is further configured to decapsulate, based on the application programming interface set by the application programming interface unit, the request message received by the first wireless communication unit, to obtain the management command; and the execution unit is configured to execute a corresponding operation according to the management command obtained by the application programming interface unit; and the mobile terminal includes a management unit, an application programming interface invoking unit, and a second wireless communication unit, where the management unit is configured to generate information that includes a management command for a wireless routing device, where the wireless routing device includes a preset application programming interface; the application programming interface invoking unit is configured to encapsulate, according to pre-obtained information about the application programming interface, the information that is generated by the management unit and includes the management command for the wireless routing device, to generate a request message that is corresponding to the application programming interface and includes the management command for the wireless routing device; and the second wireless communication unit is configured to send, to the wireless routing device, the request message that is generated by the application programming interface invoking unit and includes the management command for the wireless routing device.

It should be noted that the wireless routing device 41 and the mobile terminal 42 in this embodiment may respectively be the wireless routing device and the mobile terminal according to any one of the implementation manners provided by the foregoing two embodiments, and the wireless routing device 41 and the mobile terminal 42 are not repeatedly described herein.

In this embodiment, the wireless routing device receives a request message including a management command, where the request message is sent by the mobile terminal and corresponds to the application programming interface preset by the wireless routing device; the wireless routing device encapsulates the request message based on the application programming interface, to obtain the management command; and the wireless routing device executes a corresponding operation according to the management command. In this way, management of the wireless routing device can be implemented by using the mobile terminal, thereby improving applicability of the wireless routing device and extending an applicable scope of the mobile terminal.

Figure 5:
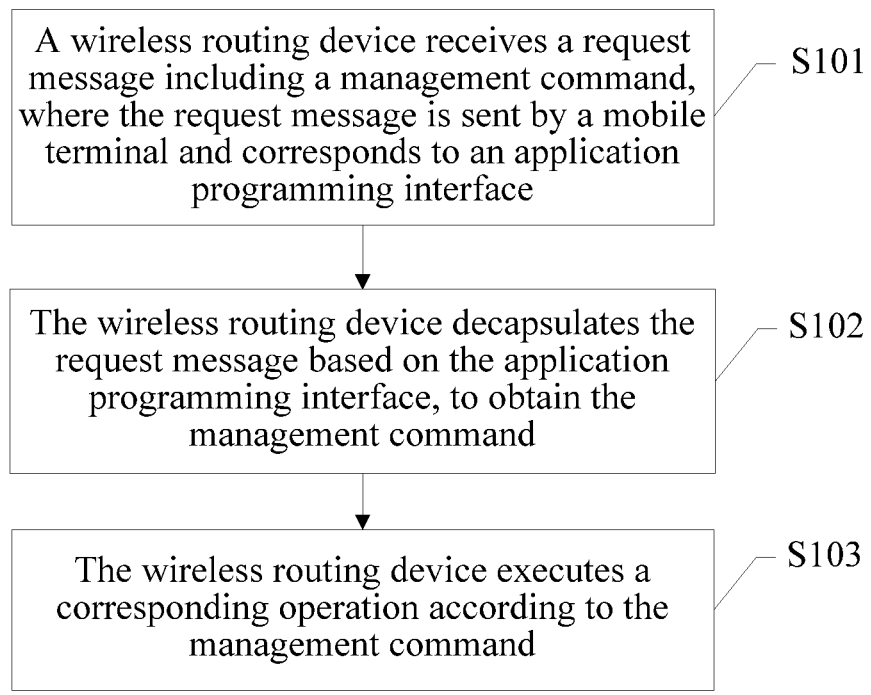
FIG. 5 is a schematic flowchart of a method for managing a wireless routing device according to a first embodiment of the present invention.

FIG. 5 is a schematic flowchart of a method for managing a routing device according to a first embodiment of the present invention. The wireless routing device in this embodiment includes a preset application programming interface. As shown in FIG. 5, the method includes:

S101: A wireless routing device receives a request message including a management command, where the request message is sent by a mobile terminal and corresponds to an application programming interface.

It should be noted that in step S101, a receiving method for receiving the request message including the management command, where the request message is sent by the mobile terminal and corresponds to the application programming interface, may be using WiFi, Bluetooth, or infrared to receive the request message including the management command, where the request message is sent by the mobile terminal and corresponds to the application programming interface, and the present invention includes but is not limited to the receiving manners listed above. The application programming interface may be an API, and the API may be a function rule.

It should be noted that before the receiving, by the wireless routing device, a request message including a management command, where the request message is sent by a mobile terminal and corresponds to the application programming interface, the method further includes setting, by the wireless routing device according to a function of the wireless routing device, an application programming interface corresponding to the function.

In this way, when the mobile terminal initiates a management process to the wireless routing device, the mobile terminal may invoke the application programming interface, and an invoking process by the mobile terminal may be: encapsulating, according to pre-obtained information about the application programming interface, generated information that includes the management command, to generate the request message that is corresponding to the application programming interface and includes the management command; and sending the request message to the wireless routing device.

S102: The wireless routing device decapsulates the request message based on the application programming interface, to obtain the management command.

It should be noted that the decapsulating, by the wireless routing device, the request message may be: performing, by the wireless routing device, HTTP decapsulation on the request message; or performing, by the wireless routing device, TCP decapsulation on the request message; or performing, by the wireless routing device, Socket protocol decapsulation on the request message; or performing, by the wireless routing device, UDP decapsulation on the request message; or performing, by the wireless routing device, HTTPS decapsulation on the request message.

Specifically, as for which protocol is used for decapsulation, different protocols may be used for decapsulation according to different application programming interfaces. In the embodiment of the present invention, the encapsulation performed on the request message includes but is not limited to the decapsulation forms listed above.

S103: The wireless routing device executes a corresponding operation according to the management command.

It should be noted that in another implementation manner, the management command generated in step S101 may be a configuration management command.

Step S103 may be that the wireless routing device executes a corresponding configuration operation according to the configuration management command.

In this implementation manner, a corresponding configuration operation may be executed according to the configuration management command sent by the mobile terminal.

The following is an example of the configuration operation.

If the request message that includes the configuration management command is the following message:

```
POST api/security/dmz HTTP/1.1
<?xml version="1.0" encoding="UTF-8"?>
<request>
    <DmzStatus>1</DmzStatus>
    <DmzIPAddress>192.168.1.101</DmzIPAddress>
</request>
``` where the request message is corresponding to an application programming interface that is set by the wireless routing device and is corresponding to a DMZ function, in step S102, the wireless routing device decapsulates the request message based on the application programming interface, to obtain the configuration management command, where the configuration management command is a configuration management command for performing configuration management of the DMZ function, and content of the configuration management is enabling the DMZ function and setting a host IP address to 192.168.1.101. In this way, in step S103 where the wireless routing device executes a corresponding configuration operation according to the configuration management command, the configuration operation is enabling the DMZ function and setting the host IP address to 192.168.1.101. The present invention also includes but is not limited to configuration operations on functions that can be implemented by the wireless routing device such as a SIM card of the wireless routing device, state monitoring, a board function, login management, and online upgrade.

Figure 6:
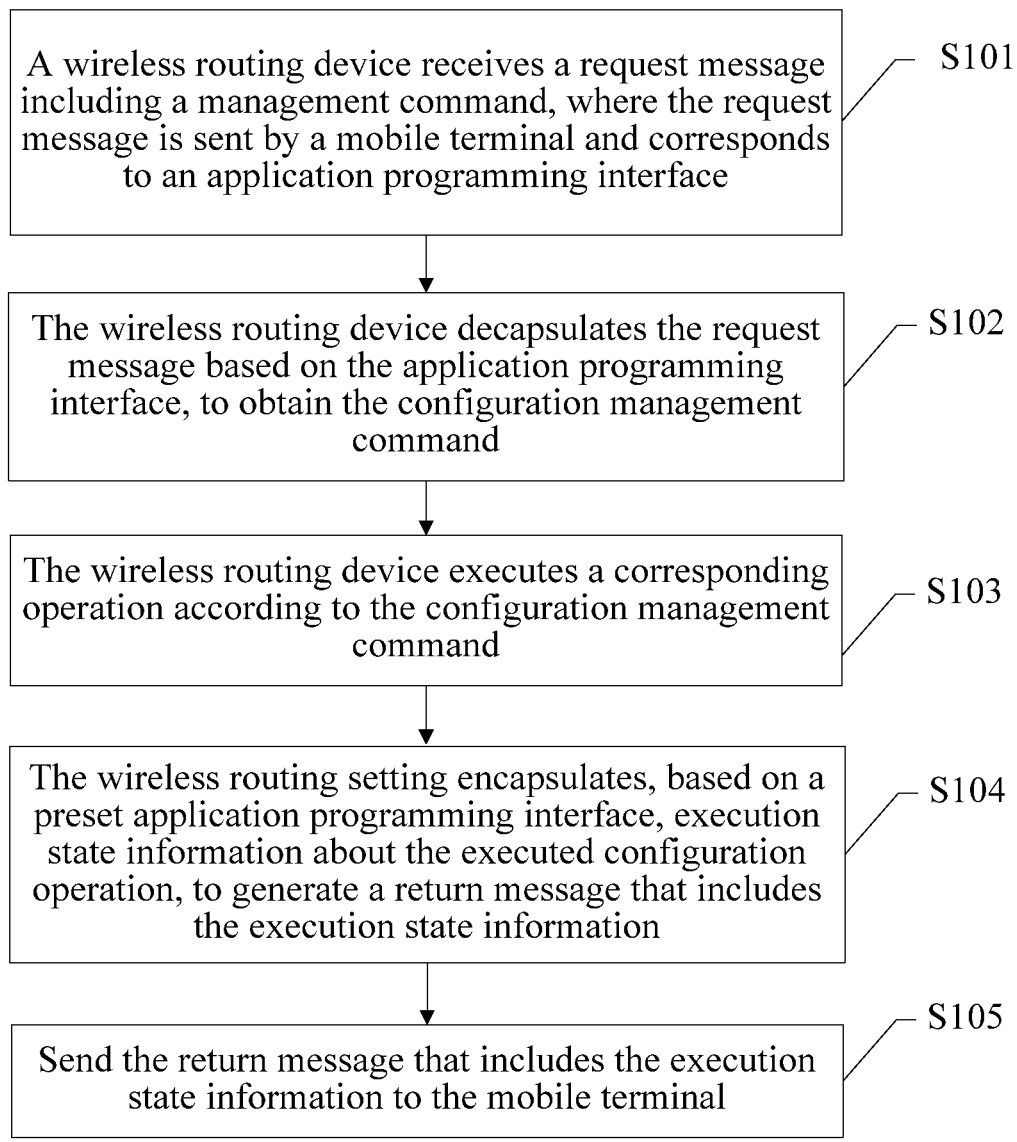
FIG. 6 is a schematic flowchart of another implementation manner of the method for managing a wireless routing device according to the first embodiment of the present invention.

In this implementation manner, as shown in FIG. 6, the method further includes:

S104: The wireless routing setting encapsulates, based on a preset application programming interface, execution state information about the executed configuration operation, to generate a return message that includes the execution state information.

S105: Send the return message that includes the execution state information to the mobile terminal.

In this way, the mobile terminal may display, on a preset management interface, the execution state information such as whether the configuration operation executed by the wireless routing device is successful or the progress of the configuration operation executed by the wireless routing device.

It should be noted that in another implementation manner, the management command generated in step S101 may be a command for requesting returning current state information. Step S103 may be that the wireless routing device encapsulates current state information based on the application programming interface, to generate a response message that includes the current state information, and sends the response message to the mobile terminal.

In this implementation manner, the mobile terminal can monitor the current state information of the wireless routing device, for example, monitor and display information such as a battery level or signal strength of the wireless routing device or the number of mobile terminals connected to the routing device.

It should be noted that the mobile terminal in this embodiment includes but is not limited to a mobile terminal such as a mobile phone terminal or a tablet computer.

In this embodiment, the wireless routing device receives a request message that is sent by the mobile terminal, and corresponding to the application programming interface preset by the wireless routing device and includes a management command; the wireless routing device encapsulates the request message based on the application programming interface, to obtain the management command; and the wireless routing device executes a corresponding operation according to the management command. In this way, management of the wireless routing device can be implemented by using the mobile terminal, thereby improving applicability of the wireless routing device and extending an applicable scope of the mobile terminal.

Figure 7:
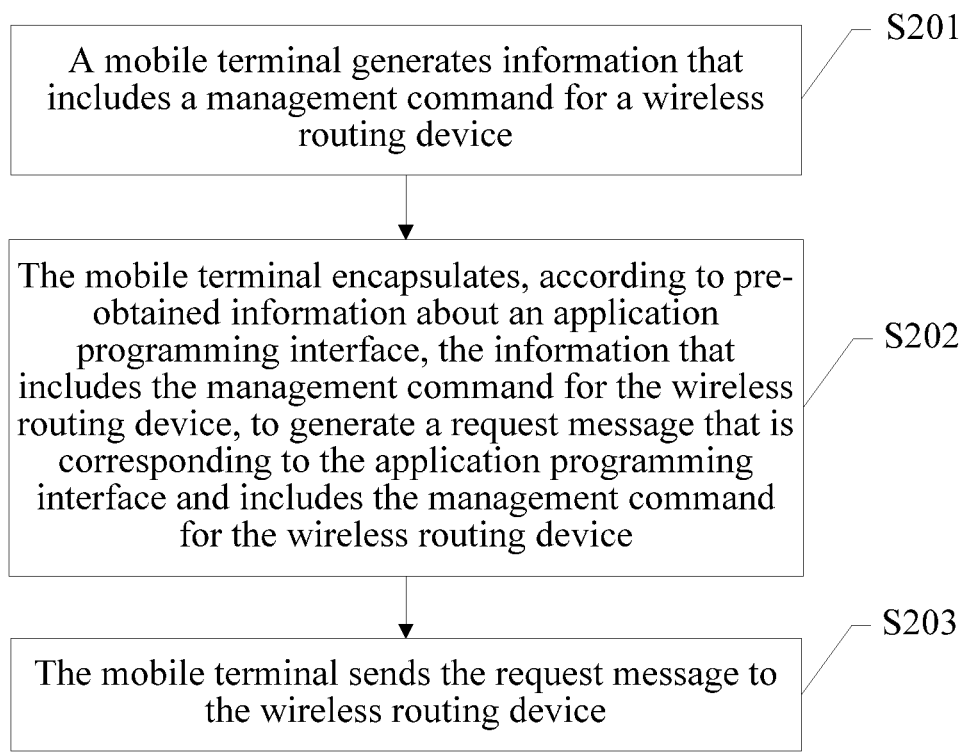
FIG. 7 is a schematic flowchart of a method for managing a wireless routing device according to a second embodiment of the present invention.

FIG. 7 is a schematic flowchart of a method for managing configuration of a wireless routing device according to a second embodiment of the present invention. As shown in FIG. 7, the method includes:

S201: A mobile terminal generates information that includes a management command for a wireless routing device, where the wireless routing device includes a preset application programming interface.

S202: The mobile terminal encapsulates, according to pre-obtained information about the application programming interface, the information that includes the management command for the wireless routing device, to generate a request message that is corresponding to the application programming interface and includes the management command for the wireless routing device.

It can be understood that before initiating a management request to the wireless routing device, the mobile terminal obtains the information about the application programming interface, so that the mobile terminal encapsulates, according to the pre-obtained information about the application programming interface, the information that includes the management command for the wireless routing device, to generate the request message that is corresponding to the application programming interface and includes the management command for the wireless routing device.

S203: The mobile terminal sends the request message to the wireless routing device.

It should be noted that in step S203, a sending method for sending, to the wireless routing device, the request message that includes the management command for the wireless routing device may be using WiFi, Bluetooth, or infrared to send, to the wireless routing device, the request message that includes the management command for the wireless routing device, and the present invention includes but is not limited to the sending manners listed above.

It should be noted that in another implementation manner, step S201 may further specifically be generating, according to an operation performed by a user on a preset management interface, the information that includes the management command for the wireless routing device.

In this implementation manner, different management commands may be generated according to different operations performed by the user on the preset management interface, so that the wireless routing device executes different operations. The preset management interface may be a management interface preset according to the pre-obtained information about the application programming interface. The management interface may include different management interfaces corresponding to different management items, such as a dedicated interface corresponding to a DMZ item of the wireless routing device and a dedicated interface corresponding to a login management item of the wireless routing device, which are not listed one by one herein. When the user needs to manage different items of the wireless routing device, the user may perform operations on different management interfaces. In this way, the mobile terminal provided by the embodiment of the present invention becomes more user-friendly. S201 may further be generating, according to an operation performed by the user on a preset window interface or widget, the information that includes the management command for the wireless routing device. Both the foregoing window interface and widget are interfaces on a mobile phone desktop. In this way, the user can manage the wireless routing device from the desktop of the mobile terminal.

It should be noted that in another implementation manner, in the information that is generated in step S201 and includes the management command for the wireless routing device, the management command may also be a configuration management command for the wireless routing device; and step S202 may further be that the mobile terminal encapsulates, according to the pre-obtained information about the application programming interface, the information that includes the configuration management command for the wireless routing device, to generate the request message that is corresponding to the application programming interface and includes the configuration management command for the wireless routing device.

In this implementation manner, corresponding configuration management may be performed according to the configuration management command sent by the mobile terminal, so that the wireless routing device executes a corresponding configuration operation according to the configuration management command.

The following is an example of the configuration management.

If the foregoing request message that includes the configuration management of the routing device is the following message:

```
POST api/security/dmz HTTP/1.1
<?xml version="1.0" encoding="UTF-8"?>
<request>
    <DmzStatus>1</DmzStatus>
    <DmzIPAddress>192.168.1.101</DmzIPAddress>
</request>
``` where the request message is corresponding to an application programming interface that is set by the wireless routing device and is corresponding to a DMZ function, the configuration management command for the wireless routing device is to perform configuration management of the DMZ function, where content of the configuration management is enabling the DMZ function and setting a host IP address to 192.168.1.101. In this way, after obtaining the configuration management command, the wireless routing device executes, according to the configuration management command, a configuration operation of enabling the DMZ function and setting the host IP address to 192.168.1.101. This example is merely an implementation example provided by the embodiment of the present invention, and the present invention also includes but is not limited to configuration management of functions that can be implemented by the wireless routing device such as a SIM card of the wireless routing device, state monitoring, a board function, login management, and online upgrade.

In this implementation manner, step S201 may further be generating, according to the operation performed by the user on the preset management interface, the information that includes the configuration management command for the wireless routing device. In this way, different information including different configuration management commands may be generated according to different operations performed by the user on the preset management interface.

In addition, after step S203, the method may further include: receiving, by the mobile terminal, a return message that is sent by the wireless routing device and includes execution state information about the corresponding configuration operation, which is executed by the wireless routing device according to the configuration management command; and displaying, by the mobile terminal, the execution state information on a preset management interface, window interface or widget.

The mobile terminal decapsulates the received return message to obtain the execution state information. In this way, the mobile terminal may display, on the preset management interface, window interface or widget, the execution state information such as whether the configuration operation executed by the wireless routing device is successful or the progress of the configuration operation executed by the wireless routing device.

It should be noted that in another implementation manner, step S201 may further be periodically generating the information that includes the management command for the wireless routing device, where the management command for the wireless routing device is a command for requesting returning current state information of the wireless routing device.

Figure 8:
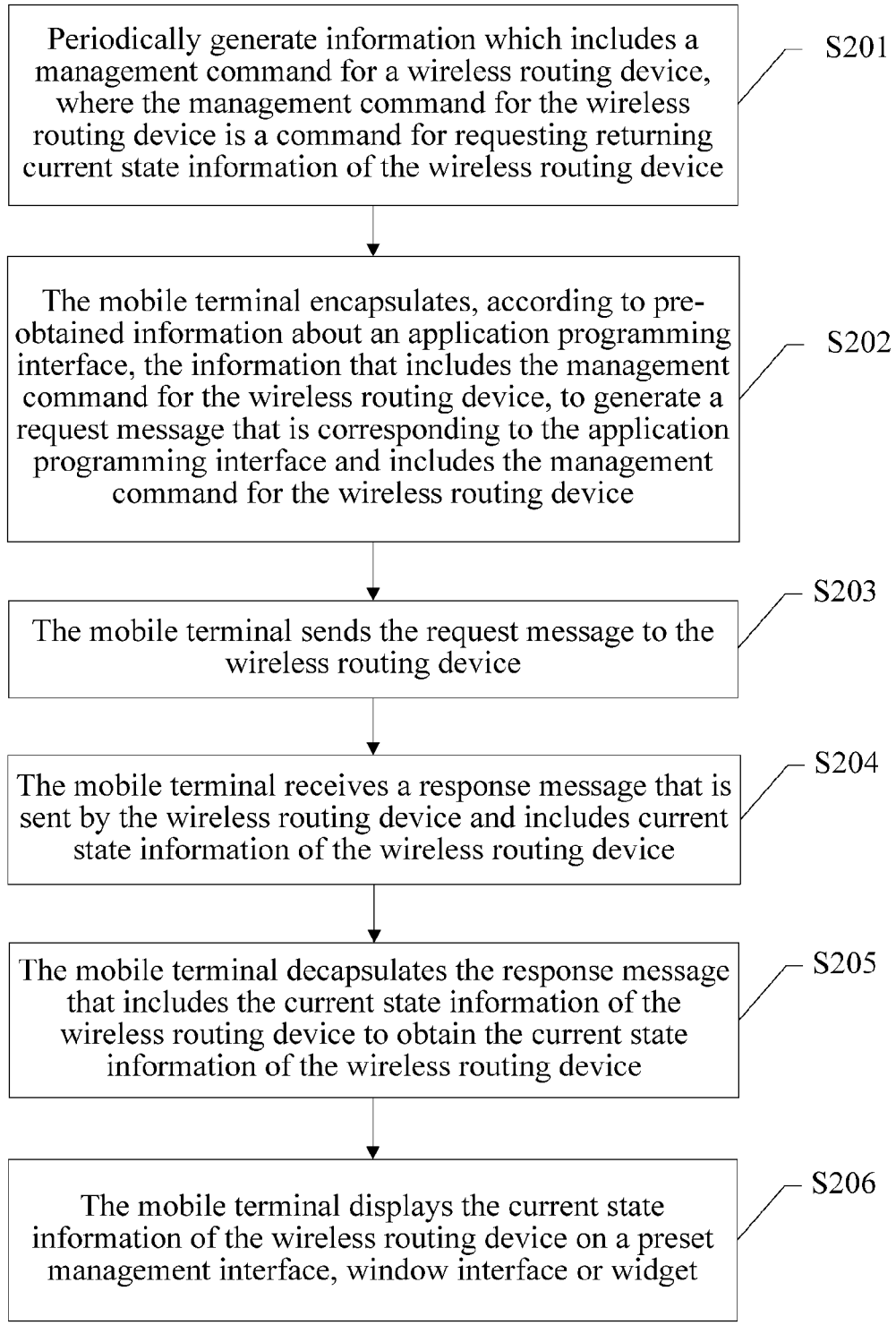
FIG. 8 is a schematic flowchart of another implementation manner of a method for managing a wireless routing device according to the second embodiment of the present invention.

In addition, in this implementation manner, as shown in FIG. 8, after step S203, the method may further include:

S204: The mobile terminal receives a response message that is sent by the wireless routing device and includes current state information of the wireless routing device.

S205: The mobile terminal decapsulates the response message that includes the current state information of the wireless routing device to obtain the current state information of the wireless routing device.

In this way, the mobile terminal can obtain the current state information of the wireless routing device in real time, thereby monitoring and managing the wireless routing device.

In addition, in this implementation manner, after step S205 where the mobile terminal decapsulates the response message that includes the current state information of the wireless routing device to obtain the current state information of the wireless routing device, the method further includes:

S206: The mobile terminal displays the current state information of the wireless routing device on a preset management interface, window interface or widget.

In this way, the mobile terminal can display the state information of the wireless routing device in real time, thereby not only monitoring and managing the wireless routing device but also enabling the user to learn the current state information of the wireless routing device in time. Both the foregoing window interface and widget are interfaces on a mobile phone desktop. In this way, the current state information of the wireless routing device can be displayed on the desktop of the mobile terminal in real time, for example, information such as a battery level or signal strength of the wireless routing device or the number of mobile terminals connected to the routing device is displayed.

It should be noted that the mobile terminal in this embodiment includes but is not limited to a mobile terminal such as a mobile phone terminal or a tablet computer.

In this embodiment, the mobile terminal generates information that includes a management command for the wireless routing device, where the wireless routing device includes a preset application programming interface; the mobile terminal encapsulates, according to pre-obtained information about the application programming interface, the information that is generated by a management unit and includes the management command for the wireless routing device, to generate a request message that is corresponding to the application programming interface and includes the management command for the wireless routing device; and the mobile terminal sends, to the wireless routing device, the request message that is generated by an application programming interface invoking unit and includes the management command for the wireless routing device. In this way, the mobile terminal can manage the wireless management device, thereby improving applicability of the wireless routing device and extending an applicable scope of the mobile terminal.

Disclosed above are only exemplary embodiments of the present invention, which are certainly not intended to limit the protection scope of the present invention. Therefore, any equivalent variation made according to the claims of the present invention still falls within the scope of the present invention.

In the foregoing embodiments, the description of each embodiment has its own focus. For the part that is not described in detail in a certain embodiment, reference may be made to related description in another embodiment.

Persons skilled in the art may understand that the accompanying drawings are only schematic diagrams of an exemplary embodiment, and the modules, entities, or processes are not necessarily indispensable in implementing the present invention.

In the several embodiments provided in the application, it should be understood that the disclosed system, apparatus, and method may be implemented in other manners. For example, the apparatus embodiments described above are merely exemplary. For example, dividing of the units is merely a type of logical function dividing, and there may be other dividing manners during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, the functional units such as the application programming interface unit and execution unit of the wireless routing device, or the management unit, the application programming interface invoking unit, and the display unit of the mobile terminal in the embodiments of the present invention may be integrated into one processing unit, or may exist alone physically, or two or more units may also be integrated into one unit. The integrated unit may be implemented in a form of hardware, or may also be implemented in a form of hardware plus a software functional module.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform a part of the steps of the methods described in the embodiments of the present invention. The foregoing storage medium includes: any medium that can store program code, such as a Universal Serial Bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features of the technical solutions. However, these modifications or replacements do not make the essence of the corresponding technical solutions depart from the spirit and scope of the technical solutions of the embodiments of the present invention.

What is claimed is:

1. A wireless routing device comprising:
   a first wireless communication unit;
   an application programming interface unit configured to set an application programming interface; and
   an execution unit,
   wherein the first wireless communication unit is configured to receive from a mobile terminal a request message comprising a configuration management command,
   wherein the request message corresponds to the application programming interface,
   wherein the application programming interface unit is further configured to decapsulate, based on the application programming interface set by the application programming interface unit, the request message received by the first wireless communication unit to obtain the management command,
   wherein the execution unit is configured to execute a corresponding operation according to the management command obtained by the application programming interface unit, and
   wherein the application programming interface unit is further configured to perform, based on the application programming interface set by the application programming interface unit, one of the following actions:
   Transmission Control Protocol (TCP) decapsulation on the request message received by the first wireless communication unit;
   Socket protocol decapsulation on the request message received by the first wireless communication unit;
   User Datagram Protocol (UDP) decapsulation on the request message received by the first wireless communication unit; or
   Hypertext Transfer Protocol over Secure Socket Layer (HTTPS) decapsulation on the request message received by the first wireless communication unit.

2. The wireless routing device according to claim 1, wherein the application programming interface unit is further configured to set, according to a function of the wireless routing device, an application programming interface corresponding to the function.

3. The wireless routing device according to claim 1, wherein the first wireless communication unit is configured to receive from the mobile terminal a request message comprising a configuration management command, wherein the request message corresponds to the application programming interface, wherein the application programming interface unit is configured to decapsulate, based on the application programming interface set by the application programming interface unit, the request message received by the first wireless communication unit to obtain the configuration management command, and wherein the execution unit is configured to execute a corresponding configuration operation according to the configuration management command obtained by the application programming interface unit.

4. The wireless routing device according to claim 1, wherein the first wireless communication unit is configured to receive a request message from a mobile terminal comprising a command for requesting returning current state information, wherein the request message corresponds to the application programming interface, wherein the application programming interface unit is configured to decapsulate, based on the application programming interface set by the application programming interface unit, the request message received by the first wireless communication unit to obtain the command for requesting returning current state information of the wireless routing device, wherein the execution is configured to obtain current state information, wherein the application programming interface unit is further configured to encapsulate, based on the application programming interface set by the application programming interface unit, the current state information obtained by the execution unit to generate a response message that comprises the current state information, and wherein the first wireless communication unit is further configured to send, to the mobile terminal, the response message that is generated by the application programming interface and comprises the current state information.

5. The wireless routing device according to claim 1, wherein the configuration management command comprises the following message:
   POST api/security/dmz HTTP/1.1
   <?xml version="1.0" encoding="UTF-8"?>
   <request>
      <DmzStatus>1</DmzStatus>
      <DmzIPAddress>IP address</DmzIPAddress>
   </request> wherein the request message corresponds to an application programming interface that is set by the application programming interface unit and corresponds to a demilitarized zone (DMZ) function, and wherein the execution unit being configured to execute the corresponding operation according to the management command obtained by the application programming interface unit comprises the execution unit being configured to enable the DMZ function and set a host Internet Protocol (IP) address.

6. A management system comprising:
 a wireless routing device; and
 a mobile terminal,
 wherein the wireless routing device comprises:
  a first wireless communication unit;
  an application programming interface unit configured to set an application programming interface, wherein the application programming interface unit is further configured to perform, based on the application programming interface set by the application programming interface unit, one of the following:
   Transmission Control Protocol (TCP) decapsulation on the request message received by the first wireless communication unit;
   Socket protocol decapsulation on the request message received by the first wireless communication unit;
   User Datagram Protocol (UDP) decapsulation on the request message received by the first wireless communication unit; or
   Hypertext Transfer Protocol over Secure Socket Layer (HTTPS) decapsulation on the request message received by the first wireless communication unit; and
  an execution unit,
 wherein the first wireless communication unit is configured to receive from the mobile terminal a request message comprising a configuration management command,
 wherein the request message corresponds to the application programming interface,
 wherein the application programming interface unit is further configured to decapsulate, based on the application programming interface set by the application programming interface unit, the request message received by the first wireless communication unit to obtain the management command,
 wherein the execution unit is configured to execute a corresponding operation according to the management command obtained by the application programming interface unit,
 wherein the mobile terminal comprises:
  a management unit;
  an application programming interface invoking unit; and
  a second wireless communication unit,
 wherein the management unit is configured to generate information that comprises a management command for a wireless routing device,
 wherein the wireless routing device comprises a preset application programming interface,
 wherein the application programming interface invoking unit is configured to encapsulate, according to pre-obtained information about the application programming interface, the information that is generated by the management unit and comprises the management command for the wireless routing device to generate a request message that is corresponding to the application programming interface and comprises the management command for the wireless routing device, and wherein the second wireless communication unit is configured to send, to the wireless routing device, the request message that is generated by the application programming interface invoking unit and comprises the management command for the wireless routing device.

7. The management system according to claim 6, wherein the configuration management command comprises the following message:
POST api/security/dmz HTTP/1.1
<?xml version="1.0" encoding="UTF-8"?>
<request>
 <DmzStatus>1</DmzStatus>
 <DmiIPAddress>IP address</DmzIPAddress>
</request>
wherein the request message corresponds to an application programming interface that is set by the application programming interface unit and corresponds to a demilitarized zone (DMZ) function, and wherein the execution unit being configured to execute the corresponding operation according to the management command obtained by the application programming interface unit comprises the execution unit being configured to enable the DMZ function and set a host Internet Protocol (IP) address.

8. A method for managing a wireless routing device, wherein the wireless routing device comprises a preset application programming interface, and wherein the method comprises:
 receiving, by the wireless routing device, a request message comprising a configuration management command, wherein the request message is received from a mobile terminal and corresponds to the application programming interface;
 decapsulating, by the wireless routing device, the request message based on the application programming interface to obtain the management command; and
 executing, by the wireless routing device, a corresponding operation according to the management command,
 wherein decapsulating, by the wireless routing device the request message comprises:
  performing, by the wireless routing device, HyperText Transport Protocol (HTTP) decapsulation on the request message;
  performing, by the wireless routing device, Transmission Control Protocol (TCP) decapsulation on the request message;
  performing, by the wireless routing device, Socket protocol decapsulation on the request message;
  performing, by the wireless routing device, User Datagram Protocol (UDP) decapsulation on the request message; or
  performing, by the wireless routing device, HTTP over Secure Socket Layer (HTTPS) decapsulation on the request message.

9. The method according to claim 8, wherein before receiving, by the wireless routing device, a request message comprising a management command, the method further comprises setting, by the wireless routing device according to a function of the wireless routing device, an application programming interface corresponding to the function.

10. The method according to claim 8, wherein the management command comprises a configuration management command, and wherein executing, by the wireless routing device, a corresponding operation according to the management command comprises executing, by the wireless routing device, a corresponding configuration operation according to the configuration management command.

11. The method according to claim 8, wherein the management command comprises a command for requesting returning current state information, and wherein executing, by the wireless routing device, a corresponding operation according to the management command comprises:
    encapsulating, by the wireless routing device, current state information based on the application programming interface to generate a response message that comprises the current state information; and
    sending the response message to the mobile terminal.

12. The method according to claim 8, wherein the configuration management command comprises the following message:
    POST api/security/dmz HTTP/1.1
    <?xml version="1.0" encoding="UTF-8"?>
    <request>
        <DmzStatus>1</DmzStatus>
        <DmzIPAddress>IP address</DmzIPAddress>
    </request>
wherein the request message corresponds to an application programming interface that is set by the application programming interface unit and corresponds to a demilitarized zone (DMZ) function, and wherein executing, by the wireless routing device, the corresponding operation according to the management command comprises the wireless routing device enabling the DMZ function and setting a host Internet Protocol (IP) address.

* * * * *